May 11, 1937.  S. F. ARBUCKLE  2,079,589
BRAKE MECHANISM
Filed March 1, 1933   2 Sheets-Sheet 1
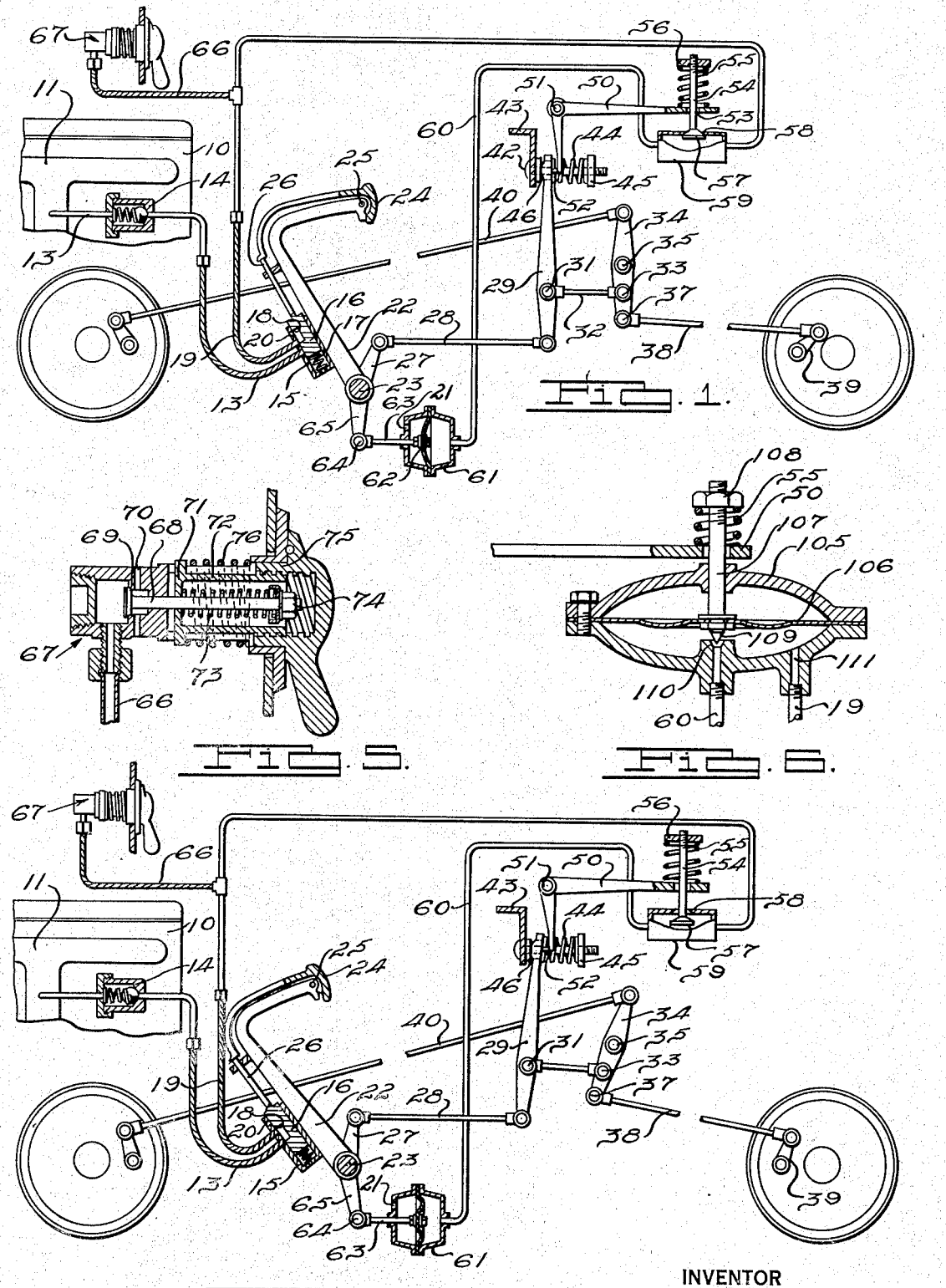
INVENTOR
Samuel F. Arbuckle.
BY
Harness, Dickey, Pierce & Hann.
ATTORNEYS.

May 11, 1937.  S. F. ARBUCKLE  2,079,589

BRAKE MECHANISM

Filed March 1, 1933  2 Sheets-Sheet 2

INVENTOR
Samuel F. Arbuckle.
BY
Harness, Dickey, Pierce & Hann.
ATTORNEYS.

Patented May 11, 1937

2,079,589

UNITED STATES PATENT OFFICE 2,079,589

BRAKE MECHANISM

Samuel F. Arbuckle, Highland Park, Mich., assignor to S. F. Arbuckle Corporation, a corporation of Delaware Application March 1, 1933, Serial No. 659,149

5 Claims. (Cl. 188—152)

The invention relates to brake mechanisms and it has particular relation to a brake mechanism for motor vehicles.

In certain respects the invention is related to those embodied in the co-pending applications for patent of Arbuckle, et al. Serial No. 266,551, filed April 2, 1928, Arbuckle Serial No. 648,510, filed December 22, 1932, and the patent to Arbuckle No. 1,834,368.

One object of the invention is to provide a brake mechanism for vehicles operated by fluid pressure responsive means controllable by a foot pedal or the like, wherein an operator manipulating the foot pedal can determine and govern the brake applying force of the fluid pressure responsive means through the sense of feel during manipulation of the pedal.

Another object of the invention is to provide a brake mechanism having the above operating characteristics wherein the brake is actuated by vacuum controlled fluid pressure responsive means.

Another object of the invention is to provide a brake mechanism operated by fluid pressure responsive means controllable by a foot pedal or the like, wherein after a predetermined application of the brake, a further increment of movement of the pedal and fluid pressure responsive means is effective to increase the operative force of the latter.

Another object of the invention is to provide a brake mechanism operated by fluid pressure responsive means controllable by a foot pedal or the like, wherein during a preliminary movement of the pedal, the fluid pressure responsive means applies the brakes, and then upon a further movement of the pedal by the operator, the operative force of the fluid pressure is increased.

Another object of the invention is to provide a brake mechanism operated by fluid pressure responsive means controllable by a foot pedal or the like, wherein during a portion of the movement of the pedal by the operator, such movement is resisted by an increasing resistance readily noticeable by the operator manipulating the pedal, which in turn varies the operative force of the fluid pressure.

Another object of the invention is to provide a more efficient fluid pressure operated vehicle brake and particularly a brake actuated by vacuum created in the motor of the vehicle.

Other objects of the invention will be apparent from the following description relating to the drawings and from the claims hereinafter set forth.

For a better understanding of the invention reference may be had to the accompanying drawings forming a part of the specification wherein:

Figure 1 is a diagrammatic view illustrating a brake mechanism constructed according to one form of the invention, with the mechanism in its inoperative condition.

Fig. 2 is a view similar to Fig. 1 but illustrating the mechanism after initial application of the brakes.

Fig. 5 is a cross-sectional view of a device for adjustably limiting the degree of vacuum which may be employed, and which is preferably mounted on the instrument board of the motor vehicle.

Fig. 6 is a cross-sectional view illustrating a valve constructed according to another form of the invention, which may be used in the vacuum line for varying the degree of vacuum during application of the brakes.

Figure 3:
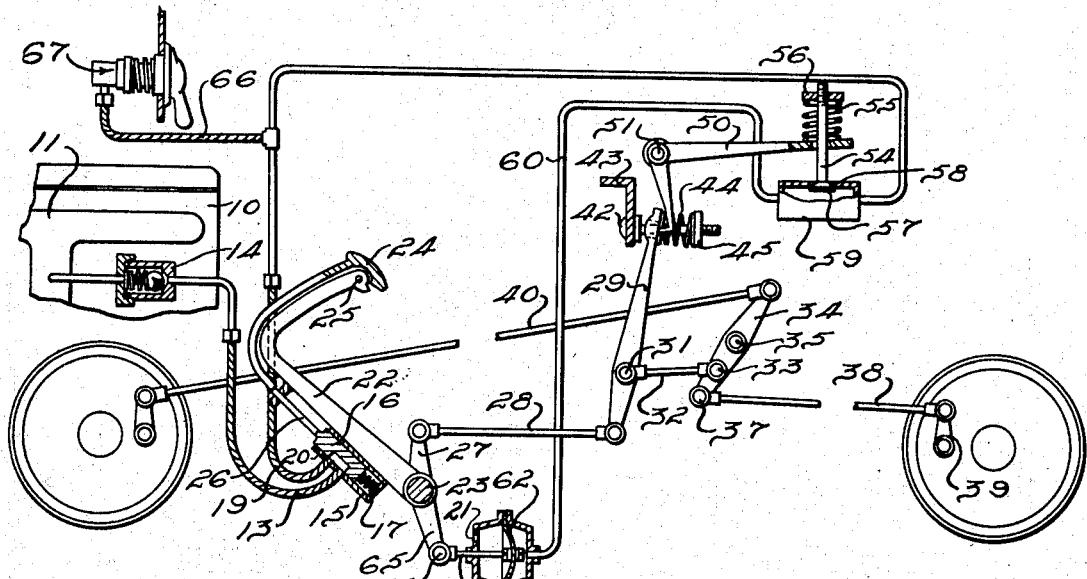
Fig. 3 is a similar view illustrating the mechanism after a further application of the brakes.

Referring to the figures, the motor of a vehicle is indicated at 10, the intake manifold thereon at 11, and a suction or vacuum line at 13. A check valve 14 provided in the suction line 13 may be of any conventional character, and this valve serves to maintain the suction or degree of vacuum in the line beyond the valve at a higher average than would be obtained if the line were directly in communication with the manifold and the check valve were not provided. Particularly in view of the fact that an increase in the speed of the motor up to a certain point also increases the degree of vacuum in the manifold but after a certain speed is obtained, the degree of vacuum becomes less, use of the check valve is advantageous in that the degree of vacuum obtained in the line beyond the valve may be maintained at a higher level.

The line 13 communicates with a valve casing 15 having a slide valve 16 therein that is normally urged upwardly by a spring 17. This valve has a recess 18 in one side adapted to connect the line 13 operatively with another line 19 upon movement of the valve downwardly. When the valve is in its upper position line 13 is closed while line 19 communicates with the atmosphere through the opening 18 and an opening 20 in the casing. The casing 15 and valve 16 therein are mounted on a foot pedal 22 connected to a cross rod 23 which may have its ends rotatably mounted in opposite sides of the vehicle frame. The upper end of the pedal terminates in a plate 24 pivotally mounted thereon as indicated at 25 and this plate is secured by means of a rod 26 to the slide valve 16. Thus by pressing on the plate 24 and moving it counter-clockwise about the pivot 25, the slide valve 16 may be moved downwardly and upon release of the plate the spring 17 will return the valve and plate to their positions shown in Fig. 1.

An arm 27 rigidly associated with the rod 23 for movement with the pedal 22 is connected at its free end by means of a rod 28 to a rocker arm 29. The rocker arm 29 intermediate its ends, is pivotally connected as indicated at 31, to a rod 32 that in turn is pivotally connected as indicated at 33 to a rocker arm 34 which is rigidly mounted on a rotatable cross rod 35. The lower end of the rocker arm 34 is pivotally connected as indicated at 37 to a rod 38 that in turn is operatively connected to brake operating means 39 for one of the rear wheels of the vehicle. The upper end of the rocker arm 34 is pivotally connected to the brake of one of the front wheels by a rod 40. It should be understood that the cross rod 35 may have another rocker arm similar to arm 34 and that similar means may be connected thereto for operating the brakes on the other wheels.

The upper end of rocker arm 29 is apertured and a bolt 42 passing through a stationary member 43, passes through the aperture in the arm and through a helical spring 44. A nut 45 on the threaded end of the bolt adjustably maintains the spring in a state of compression, and it is apparent that by adjusting the nut the compression of the spring may be varied. Attention is directed to the fact that the face of arm 29 adjacent the supporting member 43 is rounded as indicated at 46 so that the arm may fulcrum about its upper end within limits without undesirable interference such as might be present if a flat face were provided. It may be noted also that the opening in the upper end of arm 29 is larger than the bolt 42 to permit limited fulcruming movement of the arm.

A bell crank 50 pivotally mounted as indicated at 51, has one arm portion extending down along the arm 29 and is provided with a lip 52 abutting that face of the arm opposite the rounded face 46. The opposite arm of the bell crank is apertured as indicated at 53 and a valve stem 54 passing through such aperture has a helical spring 55 thereon above the arm and a nut 56 for adjustably compressing the spring against the arm. The lower end of the valve stem terminates in a valve disc 57 adapted to close an opening 58 in a passageway 59 and to separate it from communication with the atmosphere.

The suction or vacuum line 19 communicates with the passageway 59 and the latter communicates with a line 60 in turn communicating with one side of a casing comprising part of a fluid pressure responsive device 61 and which may include a diaphragm 62. A rod 63 connected to the diaphragm at its center slidably passes through the casing and is connected at its free end and in a pivotal manner as indicated at 64, to an arm 65 also mounted on rod 23 and movable with the foot pedal and arm 27. It will be understood that the space at the left side of the diaphragm will be in communication with the atmosphere and a small hole 21 in the casing of device 61 may be provided for this purpose.

The line 19 also communicates with a line 66 extending to a manual control 67 mounted on the instrument board of the vehicle, and this control briefly, and as shown by Fig. 5, includes a valve stem 68 for closing and uncovering an opening 69 that may communicate with an opening 70 to the atmosphere. The valve stem 68 slidably passes through the end wall 71 of a cylindrical sleeve 72 and within the sleeve a helical spring surrounds the valve stem and is maintained under compression against the end wall 71 by nut adjustment means 74 threaded on the end of the stem. The outer end of the sleeve 72 is threaded into a cylindrical portion of a handle 75 mounted on the instrument board and by turning the handle it is apparent that the sleeve may be moved inwardly or outwardly thus varying the compression of spring 73. A spring 76 disposed around the sleeve 72 and abutting stationary members on the instrument board at one end and a shoulder on the end wall 71 of the sleeve at its other end, normally urges the sleeve inwardly so that it will move when the handle is so turned to move the sleeve in this direction. Thus by turning the handle the compression of spring 73 may be varied and the resistance to opening of the valve by creation of vacuum in the line 66 may be varied. For example, if the vacuum reaches a certain point the valve may open and communicate the line with the atmosphere and the degree of vacuum at which the valve will open thus may be determined by turning the handle and adjusting the compression of spring 73. This manual control per se is embodied in applications for patent already filed as mentioned previously.

Now referring to Fig. 1 in general, it is apparent that the manual control on the instrument board may be used to limit the degree of vacuum that may be obtained in the suction system so as to permit an adjustment to suit varying conditions. It is also apparent that the tension on spring 55 normally holding valve 57 closed may be varied and that the tension on spring 44 may be varied.

In operating the brake, pressure is applied lightly to the plate 24 thus opening the valve 16 and communicating the suction line 13 with the line 19. Initially valve 57 will be closed and hence suction will be created at the right side of the diaphragm 62 and, owing to the atmospheric pressure on the opposite side of the diaphragm, the pedal will be moved downwardly and simultaneously arms 27 and 65 will be turned therewith. This will result in a movement of rod 28 to the left and initially a fulcruming of arm 29 about its upper end as the compression of spring 44 is adjusted sufficiently to maintain the upper end of the arm against the stationary member 43 during this initial action of the fluid pressure responsive device. This fulcruming movement of arm 29 will cause an initial application of the brakes through rod 32 turning the rocker arm 34, until the resistance of the brakes to further application balances the force of the fluid pressure responsive means.

Upon this initial application of the brake by the suction in the system, valve 57 will open after a certain degree of vacuum is obtained and close if the degree of vacuum substantially decreases. The parts now being arranged as shown by Fig. 2, further movement of the pedal downwardly by the operator in conjunction with the action of the fluid pressure device will move arm 29 farther but, owing to the resistance to further application of the brakes, arm 29 instead of fulcruming about its upper end, begins to fulcrum about the pivot 31. This fulcruming movement about the pivot 31 is shown by Fig. 3 and it will be appreciated that this will cause an increased compression of spring 44 as well as a turning of bell crank 50. During this further movement of the pedal an increase in application of the brakes will occur as arm 29 will move slightly to the left as it fulcrums about the pivot 31 and compresses spring 44. Simultaneously with this increasing compression of the spring, bell crank 50 is being turned and this increases the compression of spring 55, thus causing the valve 57 to be more strongly seated. This necessarily will allow an increase in the vacuum in the system as valve 57 cannot open until a higher degree of vacuum is obtained.

When the degree of vacuum increases, the operative force of the fluid pressure responsive device will increase until the foot pedal pressure is not needed to hold the parts in the new positions effected by pushing of the pedal. If the pedal were pushed harder, the arm would be moved further and the increase in brake application and compression of springs 44 and 55 would be greater, thereby causing a greater degree of vacuum to be obtained. This greater degree of vacuum would cause the operative force of the fluid pressure responsive means to be greater but it will also be appreciated that the resistance to further compression of spring 44 and further application of the brakes would be greater. Accordingly, when the pedal is pushed, the result is an increased compression of spring 44, increase in brake application and hence increase in resistance to further brake application, and an increase in the operative force of the fluid pressure responsive device until the foot pedal pressure is not needed to hold the parts in their new positions.

If the pedal is again pushed, greater pressure will be required to compress spring 44 and further apply the brakes as occurs during the further compression of the spring, and while the force of the fluid pressure responsive device operates in conjunction with pushing of the pedal, the operator pushes the pedal against an increased resistance and feels the latter. It might be noted that this increased resistance to pushing of the pedal is greater than the resistance to the first pushing of the pedal described previously. After such second pushing of the pedal and the increase in vacuum is effected, the increased operative force of the fluid pressure responsive means renders the foot pedal pressure unnecessary.

Movement of the foot pedal by increments in this manner may be effected to apply the brakes more and more forcefully. Each time the pedal is pushed, however, there is a greater resistance to its movement by the foot and it follows that the operator can feel the force of brake application by the increasing resistance to movement of the pedal although the resistance is not undesirably great owing to the assistance of the fluid pressure responsive device. Normally, the pedal may be pushed down more rapidly and while increasing application of the brakes will be in increments as described, coinciding with pushing of the pedal by increments, the actions will follow so closely one after the other that the operator may be conscious only of an increasing resistance to movement of the pedal by the foot.

At any time, however, the operator need only to release plate 24 on the pedal, to release the brakes.

The manual control on the instrument board enables limiting any degree of vacuum to be obtained so as to positively limit the operative force of the fluid pressure responsive means and, while the control limits the degree of vacuum which may be obtained in the system, this control of course does not prevent further manual operation of the pedal after the manual control valve opens although the operative force of the fluid pressure responsive device will not increase further. Regardless of the vacuum operation of the brakes, the operator of the vehicle at all times is in control of the brakes by manual manipulation of the pedal.

Figure 4:
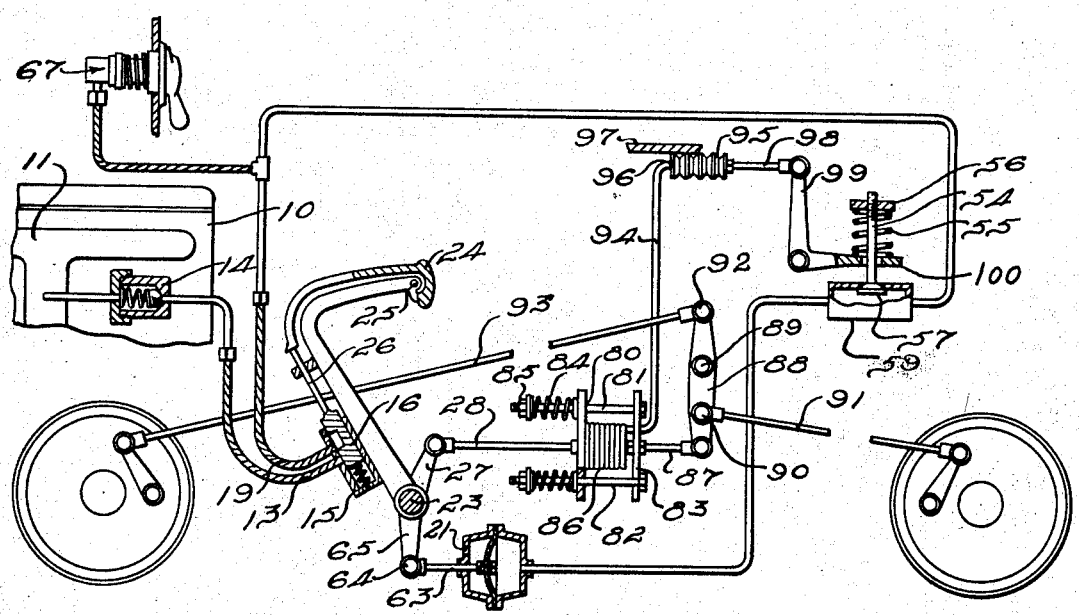
Fig. 4 is a view similar to Fig. 1 but illustrating a brake mechanism constructed according to another form of the invention.

The construction shown by Fig. 4 will obtain substantially the same results. In this construction the rod 28 is connected to a plate 80 slidably mounted on a pair of rods 81 and 82 secured to a similar plate 83. The plate 80 is urged towards the plate 83 by helical springs 84 mounted on the ends of rods 81 and 82 projecting beyond plate 80 and which are adjustably compressed thereagainst by nuts 85 on the outer ends of the rods. Between the plates 80 and 83 a fluid bellows 86 is provided, which is fastened at opposite ends to both plates.

A rod 87 is connected to plate 83 and pivotally to a rocker arm 88 mounted on a cross rod 89 rotatably mounted in the frame of the vehicle. The rocker arm 88 at one end is pivotally connected as indicated at 90 to a brake operating rod 91 for one of the rear wheel brakes, and at its other end is pivotally connected as indicated at 92 to a brake operating rod 93 connected to one of the front brakes. It will be understood that the rod 89 may have another rocker arm similar to arm 88 which may be connected to the brakes of the other wheels in a similar fashion.

The bellows 86 is connected by a fluid line 94 to a smaller bellows 95 having one end indicated at 96 rigidly secured to a stationary member 97. The opposite end of the bellows 95 is connected by means of a rod 98 to a bell crank 99 having an arm 100 associated with the valve stem 54 previously described. In operation of this arrangement, initial movement of the plate 24 on the foot pedal merely opens the valve 16 so that the brakes initially will be applied by the fluid pressure responsive means. Action of the fluid pressure responsive means will depress the pedal and pull the plate 80 to the left and this plate through the action of springs 84 and rods 81 and 82 will pull the plate 83 to the left to apply the brakes initially. This will occur without any noticeable increase in compression of springs 84 and expansion of the bellows. At this time the fluid pressure responsive means will act until further application of the brakes sufficiently resists further movement of plate 83 and since springs 84 will be so adjusted that further separation of plates 80 and 83 by the initial action of the fluid pressure responsive means will be sufficiently resisted by the springs, the system will reach a point of equilibrium.

Now if the operator pushes the pedal, this increase in force will apply the brakes still further and also compress springs 84, although the foot pedal pressure needed to do this is not undesirably great owing to the assistance of the fluid pressure responsive device. This compression of the springs causes expansion of the large bellows 86 and since the bellows 86, line 94 and bellows 95 comprise a closed fluid system, the smaller bellows 95 will collapse accordingly. This causes a movement of bell crank 99, compression of spring 55, an increase in the degree of vacuum in the system and accordingly an increase in the operative force of the fluid pressure responsive device. The increase in force of the latter renders the foot pedal pressure unnecessary to hold the parts in their new positions. Additional pushing of the pedal will cause additional application of the brakes and increase in the operative force of the fluid pressure responsive device until the pressure on the pedal again is not needed or balanced. Each further push on the pedal is increasingly resisted owing to the increasing resistance of the springs to compression and accordingly the operator is conscious of the increasing force of brake application in the same manner as described with respect to the first mechanism described.

The various spring adjustments will permit use of either mechanism in such manner that an increase in the degree of vacuum and increase in the operative force of the fluid pressure responsive device may be insufficient to render pressure on the pedal unnecessary, or in other words, the increase in the operative force of the fluid pressure responsive device may not be as great or sufficient to balance as the force of the pedal pressure. Thus during operation of the mechanism under these conditions, the operator would push the pedal (after initial application by tilting plate 24) and after the resulting increase in degree of vacuum, he still would have to maintain pressure on the pedal to hold the parts in their new positions. Then upon further pushing of the pedal, a further pressure would be required to increase the degree of vacuum, and after this occurred, he would have to hold the pedal in place with a pressure still greater than that which is required to hold the pedal in place after the first push. Thus increasing pressures would be required to move the pedal, as determined by the increase in resistance to compression of springs 84 and the increasing differential between the foot pedal pressure and increase in the operative force of the fluid pressure responsive device.

The springs also could be so adjusted that after initial application of the brakes by tilting plate 24, a push on the pedal would cause such increase in degree of vacuum in the system that the operative force of the fluid pressure responsive device would be so increased that the foot pedal pressure would not only be balanced, but that a further movement thereof would occur. This further movement would automatically increase the degree of vacuum in the system in the same manner that a further push on the pedal would effect it, and then the fluid pressure responsive device would act to apply the brakes more forcefully and again increase the movement of the pedal. In this manner, the force would build up automatically upon applying initial pressure to the pedal. In the event the operator continued to push the pedal with foot pressure, this building up of the force would still further be accentuated. The operator however need only remove the foot at any time to release the brake.

Fig. 6 illustrates another type of valve construction that may be employed in place of the valve heretofore described. In this construction a two part housing 105 is provided and a diaphragm 106 extends transversely of the housing between the parts thereof. The diaphragm is connected to a pin 107 slidably projecting through one side of the housing and this pin extends through arm 50, helical spring 55 and beyond the spring a nut 108 is provided for adjustably compressing the spring. The opposite end of pin 107 and at the opposite side of the diaphragm 106, is tapered as indicated at 109 and is adapted to close a valve opening 110, in the opposite side of the housing. This opening is in communication with line 60, and line 19 may communicate with this side of the housing through an opening 111 therein. Thus when valve 109 is seated, lines 19 and 60 are disconnected and when the valve is raised, they are in communication with each other. When this type of valve is employed, further compression of spring 55 will naturally cause the valve 109 to remain open until a higher degree of vacuum is obtained when the relatively high atmospheric pressure acting against the diaphragm then will close the valve. Instead of allowing atmospheric air to enter the system in the manner described with respect to Fig. 1, in the present construction, the valve is closed to separate line 60 from line 19. An advantage of this construction is that air is not allowed to enter that part of the system between the valve and the fluid pressure responsive means except upon releasing plate 24 which will open line 19 to the atmosphere and then atmospheric pressure below the diaphragm will naturally balance both sides of the diaphragm and allow the spring to open the valve.

From the foregoing description it will be appreciated that a brake system has been provided which will enable the operator of the brakes to feel the force of application and, while this feel may be actually proportionate to the force with which the brakes are applied, it will enable him to feel through the pedal the amount the brakes are being applied. This is of considerable importance in fluid pressure operated brakes where ordinarily operation depends upon opening a valve. If all the operator does is open a valve gradually it is difficult to appreciate the force with which the brakes are being applied but if movement of the pedal is increasingly resisted in a very noticeable manner which can be felt through the foot, the operator at all times will realize the force of brake application.

Although more than one form of the invention has been described and illustrated in detail, it will be appreciated by those skilled in the art that various modifications may be made without departing from the scope of the appended claims.

I claim:

1. A brake mechanism comprising a brake, a rocker arm, a fixed means and a yieldable means engageable with a portion of said rocker arm with the yieldable means tending to urge said portion of the rocker arm into contact with the fixed means, fluid pressure responsive means for actuating the brake, manually controlled means for displacing said portion of the rocker arm in a direction away from said fixed means with the yieldable means increasingly resisting increased displacement of said portion of the rocker arm away from said fixed means, and means responsive to the displacement of said portion of the rocker arm away from said fixed means for varying the operative force of the fluid pressure responsive means.

2. A brake mechanism comprising a brake, manual actuating means including a rocker arm for actuating the brake, a fixed means and a yieldable means both engageable with a portion of said rocker arm with the yieldable means in stressed condition and urging said portion of the rocker arm into contact with said fixed means upon initial movement of said actuating means but yieldably opposing displacement of said portion of the rocker arm in a direction away from said fixed means upon further movement of said actuating means, fluid pressure responsive means for actuating the brake, and means governed by the displacement of said portion of the rocker arm away from said fixed means for varying the operative force of the fluid pressure responsive means.

3. A brake mechanism comprising a brake, fluid pressure means, means connecting the fluid pressure means to the brake and including a movable part, a fixed abutment means contacting one side of said movable part when said brake is in unapplied condition, and a resilient means supported by said fixed abutment means and contacting the opposite side of said movable part, means for conditioning said resilient means to exert a predetermined force upon said movable part when the latter contacts the fixed abutment means, said resilient means and said movable part being so arranged that movement of said part away from said fixed abutment means causes an increase in the force exerted by the resilient means on said movable part, manually controlled means for displacing said movable part against the force exerted by said resilient means, and means governed by such displacement of said movable part and proportional thereto for correspondingly varying the operative force exerted by the fluid pressure means.

4. A brake mechanism comprising a brake, manual actuating means including a rocker arm for actuating the brake, a fixed means, a resilient means interposed in stressed condition between said fixed means and a portion of said rocker arm and so arranged as to be further stressed upon movement of said portion of the rocker arm relative to said fixed means, fluid pressure responsive means for actuating the brake, and means governed by movement of said portion of the rocker arm relative to said fixed means and proportional to the extent of such movement varying the operative force which the fluid pressure responsive means can exert in applying said brake.

5. A brake mechanism comprising a brake, manual actuating means including a rocker arm for actuating the brake, a fixed means, an element adjustably mounted on said fixed means, a resilient means interposed between said adjustable element and a portion of the rocker arm and arranged in stressed condition in accordance with the position of adjustment of said adjustable element on said fixed means to apply a predetermined force on said portion of the rocker arm, said resilient means and rocker arm being so arranged that movement of the latter to actuate said brake to applied condition increases the force applied by the resilient means to said portion of the rocker arm, fluid pressure responsive means for actuating the brake, and means responsive to that movement of said portion of the rocker arm which causes an increase in the force applied by said resilient means to the rocker arm for increasing the operative force which the fluid pressure responsive means can exert in applying said brake.

SAMUEL F. ARBUCKLE.